United States Patent [19]

Janicki et al.

[11] Patent Number: 4,923,542
[45] Date of Patent: May 8, 1990

[54] METHOD OF MAKING A COMPOSITE CAR DOOR PANEL

[75] Inventors: Mark A. Janicki, Kettering; Paul S. Schultz, Miamisburgh, both of Ohio

[73] Assignee: Monarch Marking Systems, Inc., Dayton, Ohio

[21] Appl. No.: 290,067

[22] Filed: Dec. 27, 1988

[51] Int. Cl.$^5$ .......................... B32B 31/10; B32B 7/08
[52] U.S. Cl. ............................ 156/92; 49/502; 52/717.1; 156/249; 156/289; 428/31
[58] Field of Search ................. 49/502; 52/716, 717.1; 156/91, 92, 249, 289; 428/31

[56] References Cited

U.S. PATENT DOCUMENTS

| | | | |
|---|---|---|---|
| 3,837,984 | 9/1974 | Wagner et al. | 52/717.1 X |
| 4,074,501 | 2/1978 | Sandqvist | 156/92 X |
| 4,270,328 | 6/1981 | Page et al. | 52/717.1 X |
| 4,364,591 | 12/1982 | Bien | 428/31 X |
| 4,546,021 | 10/1985 | Mears | 428/31 |

FOREIGN PATENT DOCUMENTS 1292962 10/1972 United Kingdom .

Primary Examiner—Robert A. Dawson
Attorney, Agent, or Firm—Joseph J. Grass

[57] ABSTRACT

There is disclosed a composite car door panel and method of making same. The panel includes a pair of panel sections adhesively adhered to each other by pressure sensitive adhesive. Headed fasteners used to attach the panel to a car door frame are able to be oriented relative to holes in the car door frame because the fasteners are movable relative to the panel due to masking of the fasteners from the adhesive.

12 Claims, 2 Drawing Sheets

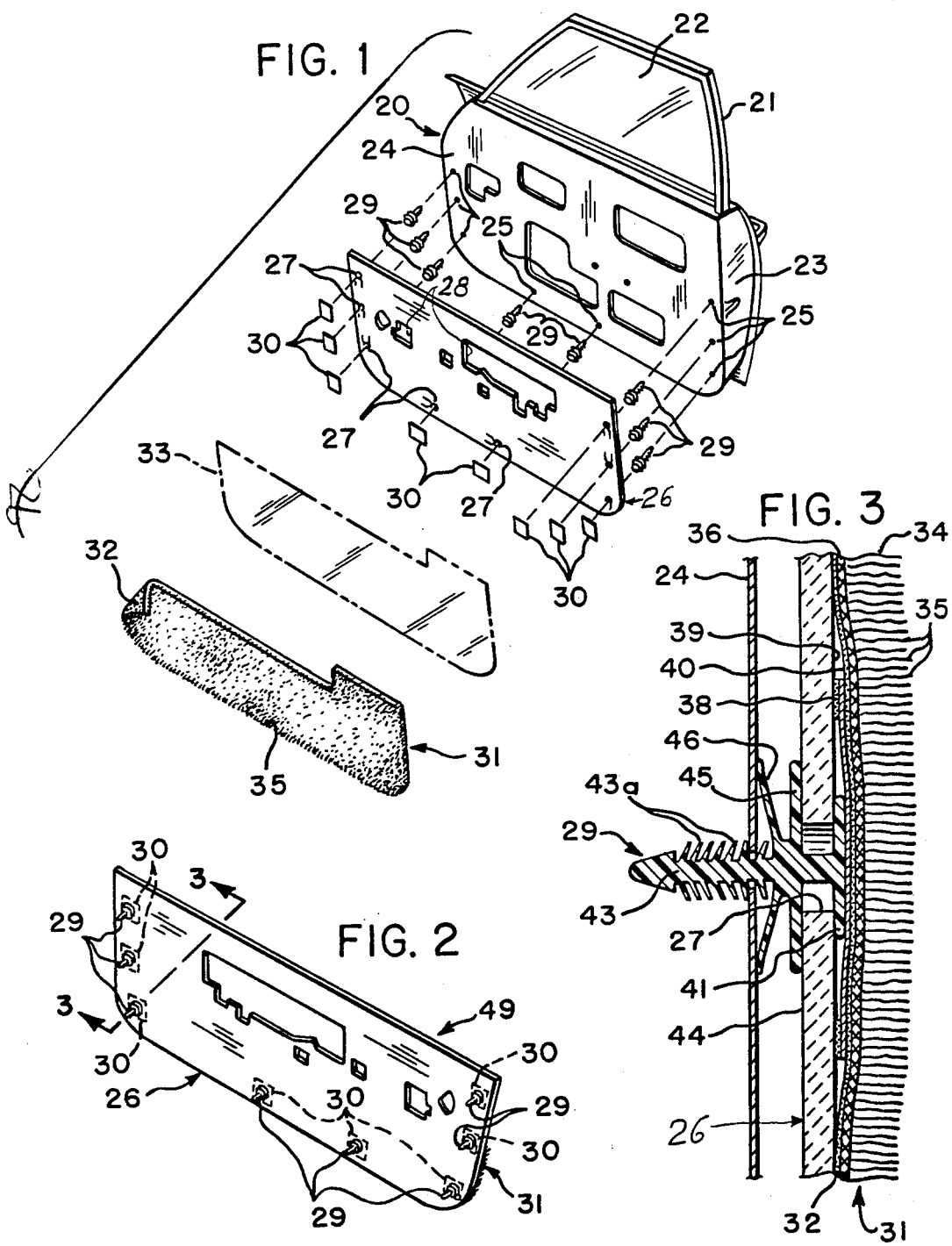

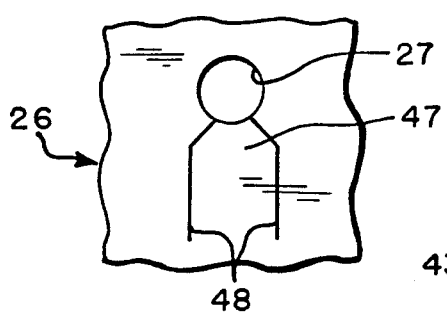
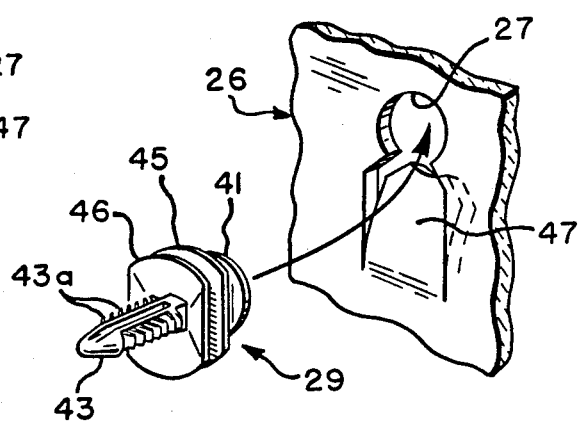
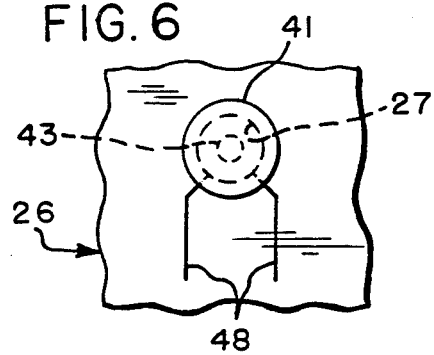
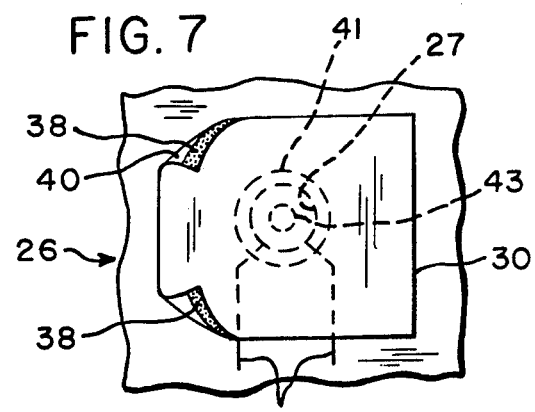
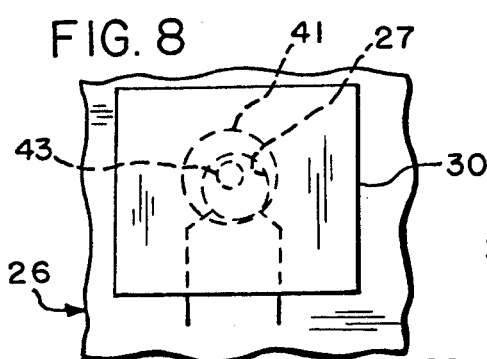
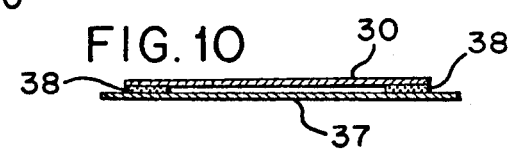
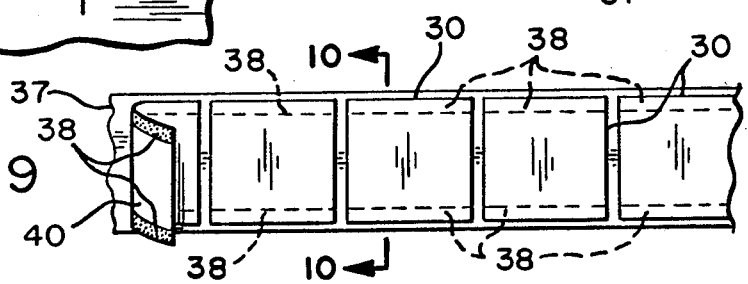

though it is preferred that the masking only be over
the fastener head.

METHOD OF MAKING A COMPOSITE CAR DOOR PANEL

BACKGROUND OF THE INVENTION

1. Field of the Invention

This invention relates to the art of car doors and particularly to panels for car door frames and methods of making same.

2. Brief Description of the Prior Art

Prior art composite car door panels were made by providing a generally planar first panel section with holes to receiving headed fasteners. Each fastener had a head and a shank. Each fastener was loosely secured in a respective hole in the first panel section. More specifically, the hole was substantially larger in diameter than the diameter of the shank so that the fastener could be oriented relative to the panel. The panel also included an inner or second panel section which was normally decorative. The second panel section typically comprised carpeting material which covered the lower portion of the first panel. The second panel section was coated with a solvent-type liquid adhesive shortly before lamination to the first panel section. The second panel section was positioned against the lower portion of the first panel over the headed fasteners and the adhesive was in contact with the fasteners. The laminated first and second panel sections constituted a panel. In that the freshly applied liquid adhesive did not dry immediately, the shanks of the fasteners could still be oriented into alignment with holes in the car door frame. If the panel was not attached to the car door frame soon after the adhesive was applied, the adhesive would harden and the fasteners became rigidly affixed to the panel. This made it difficult or impossible to align the shanks of the fasteners with the holes in the car door frame.

With the replacement of adhesives of the solvent-based type with solventless type adhesives, it became desirable to provide the decorative second panel sections with a coating of pressure sensitive adhesive of the latter type and to provide a release liner over the adhesive which was stripped off just before the second panel section was adhered to the first panel section. This caused a problem in that the pressure sensitive adhesive adhered tenaciously to the heads of the fasteners and limited movement of the fasteners so that orientation of the shanks of the fasteners into alignment with holes in the car door frame was either difficult or impossible. If all the fasteners could not be aligned with the respective holes, the panel had to be discarded as scrap.

British patent No. 1,292,962 published 18 October 1972 relating to imrpovements in or relating to labels is made of record.

SUMMARY OF THE INVENTION

This invention relates to a convenient and low-cost method of making composite panels for car doors and attaching such panels to car door frames. The invention also relates to low-cost, easy-to-use composite panels for car doors and to car doors per se. It is an object of the invention to provide improved methods of making composite car door panels and to composite car door panels per se which avoid the above-mentioned problems.

According to a specific embodiment of the invention, headed fasteners are attached to a generally planar first panel section so that they will be able to be oriented, e.g. shifted in the plane of the panel section or skewed slightly. Next the fasteners are masked off. The masking can take a variety of forms, e.g., a pressure sensitive label can be applied over the fastener and adhered to the first panel section. The label has an adhesive-free area or zone over the head of the fastener. The adhesive-free zone is wide enough so that adhesive on the remainder of the label will not prevent shifting of the fastener relative to the first panel section. Alternatively, an area on a full-gum pressure sensitive label can be deadened, with the area being large enough to mask off the head of the fastener. Another alternative is to use a section of a full-gum label's carrier sheet or web to mask off an area overlying the head of the fastener. A second panel section with a coating of pressure sensitive adhesive is readied by stripping a release liner from the adhesive and positioning the second panel section over at least a portion of the first panel section and over the labels on the first panel section. While the adhesive on the second panel section adheres to the labels, the labels mask off the fasteners so the fasteners are still able to be oriented relative to the first panel section for proper alignment with the car door frame.

BRIEF DESCRIPTION OF THE DRAWINGS

FIG. 1 is an exploded perspective view of a car door frame and a panel;

FIG. 2 is an assembled view of a composite car door panel in accordance with the invention;

FIG. 3 is a sectional view taken generally along line 3—3 of FIG. 2;

FIG. 4 is an enlarged elevational view of a fragmentary portion of the first panel section showing the hole for receiving a fastener;

FIG. 5 is a perspective view of a fastener about to be connected to the first panel section;

FIG. 6 is an enlarged elevational view showing the fastener received in the hole;

FIG. 7 is an elevational view showing a label adhesively adhered to the first panel section and masking off the head of the fastener, with the fastener being centered with respect to the hole;

FIG. 8 is a view similar to FIG. 7, but showing the fastener oriented off-center with respect to the hole;

FIG. 9 is a top plan view of a web of pressure sensitive labels useful in carrying out the invention; and FIG. 10 is a sectional view taken along line 10—10 of FIG. 9.

DETAILED DESCRIPTION OF THE PREFERRED EMBODIMENT

With reference to FIG. 1, there is shown a car door frame generally indicated at 20 having a window frame portion 21 for a window 22 and a main frame portion 23. The main frame portion 23 has a panel member 24 with a series of holes 25.

A generally planar first panel section 26 has a configuration to fit the main frame portion 23. The panel section 26 has a series of holes 27 which are alignable with the holes 25. The panel section 26 also has a variety of cutouts 28 for receiving various components (not shown) of the door mechanism. There is a fastener 29 for each hole 27 and a label 30 is adhered to the panel 26 over each fastener 29.

A generally planar second panel section 31 has a uniform and continuous coating of pressure sensitive adhesive 32. Initially, a release liner 33 is releaseably adhered to the adhesive 32 on the panel section 31. The release liner 33 is shown in phantom outline because it is removed before the panel section 31 is adhered to the panel section 26 and forms no part of the claimed combination. As best shown in FIG. 3, the panel 31 is illustrated to comprise carpet material 34 having nap 35 and a backing 36.

With reference to FIGS. 3 and 7 through 10, the label 30 is shown in greater detail. The labels 30 are shown in FIG. 9 to be releasably adhered to a release liner or carrier web 37. There is a patterned coating of pressure sensitive adhesive comprising preferably two adhesive areas or zones of adhesive 38 located at the longitudinal side marginal edges of the labels 30. If desired, the label 30 could be provided with only one zone 38. The adhesive 38 is shown in FIGS. 3, 7 and 8 to be adhered to the inner surface 39 of the panel section 31. The portion of the label 30 between the zones of adhesive 38 constitutes an adhesive-free zone 40. As shown, the adhesive free zone 40 covers or masks off head 41 of the fastener 29. The adhesive-free zone 40 is large enough so that irrespective of the position of the head of the fastener, the head 41 is masked off from adhesive 32 on the underside of the panel section 31, as best seen in FIGURE 8. As shown, the zones of adhesive 38 are spaced widely enough as not to interfere with orientation or repositioning of the fastener 29 on the panel section 26. The illustrated one-piece molded plastics fastener 29 has a shank 43 projecting from the head 41. The head 41 is against the inner surface 39 of the panel section 26 and the shank 43 extends through the hole 27 and projects beyond outer surface 44 of the panel section 26. The shank 43 has a perpendicular flange 45 in contact with the surface 44 and a resilient cone-shaped flange 46 in contact with the panel member 24 of the door frame 23. The shank 43 also has two diametrically positioned rows of one-way rake-shaped teeth 43a which enable the shank 43 to readily enter the hole 25 in the door frame 23, but render it difficult to remove the shank 43 from the hole 25.

As best shown in FIG. 4, the hole 27 is adjacent a tab 47 formed by angled cuts 48 in the panel section 25. The tab 47 can be deflected as best shown in FIG. 5. Once the tab 47 is deflected as shown in FIG. 5, the fastener 29 can be inserted into the opening left by the deflected tab 47. The outward extent of the flanges 45 and 46 is less than the opening left by the deflected tab 47. Once so inserted, the fastener 29 can be oriented by sliding the fastener 29 so that the head 41 contacts the inner surface 39 and the flange 45 contacts the outer surface 44. It is noted that the head 41 is larger in diameter than the diameter of the hole 27.

No novelty is claimed per se in the car door frame 20, or the panel 26, or the panel 31, or the fastener 29, all of which have been used in the prior art method of assembling of a car door panel onto a door frame.

In carrying out the improved method of the invention, the fasteners 29 are positioned in the holes 27 in the panel section 26 and labels 30 or other suitable masking is applied over the heads 41 of the fasteners so that the fasteners 29 can be oriented, e.g. shifted in the plane of the panel section 26. The labels 30 can be stripped from the release liner 37 either manually or the labels 30 can be stripped and applied using a commercially available hand held labeler of the type sold by Monarch Marking Systems, Inc., Dayton, Ohio U.S.A. and depicted in its U.S. Pat. No. 4,619,727. If desired, the labels 30 can be applied over the holes 27 in the position shown in FIG. 7 for example, before the fasteners 29 are inserted into the holes 27. Because the zones of adhesive 38 are relatively wide apart, it is not necessary to use any great amount of care in applying the labels 30. In preparing to apply the panel section 31, the release liner 33 is stripped from the adhesive 32 on the backing 36 and the panel section 31 is applied over the lower portion of the panel section 26. The panel sections 26 and 31 thus attached to each other form a laminate or composite car door panel generally indicated at 49 in FIG. 2. The panel 49 can now be aligned with the lower portion of the car door frame 20 with the shanks 43 of the fasteners 29 in approximate alignment with the holes 25. The upper portion of the door frame above the place where the panel 48 is attached is provided with another panel (not shown). In that the fasteners 29 are loosely mounted in the panel section 26, the shanks 43 of the fasteners 29 that are not well enough aligned with the holes 25 can be guided to the holes 25 manually.

Alternative to a patterned-gum label, such as the label 30, to mask off the head of the fastener, a full-gum label (not shown) namely, a label having a continuous coating of pressure sensitive adhesive can be used, wherein an area of the adhesive is deadened by commercially available adhesive deadeners or otherwise rendered ineffective. The deadened or ineffective area is large enough to enable to fastener to be oriented, in the same manner as the label 30 enables the fastener 29 to be oriented.

Another alternative arrangement for accomplishing the purposes of the invention is to use a full-gum pressure sensitive label adhered to a carrier sheet or web. An area of the carrier sheet or web is completely severed to provide a severed carrier section that is allowed to remain adhered to the label in the plane of the carrier sheet or web. The severed carrier section takes any desired form such as rectangular, round, oblong or the like. The resulting label is applied to the inner panel with the severed carrier section covering the hole 27. The area of the severed carrier section is large enough to enable the fastener to be oriented in the manner described above.

Other embodiments and modifications of this invention will suggest themselves to those skilled in the art, and all such of these as come within the spirit of this invention are included within its scope as best defined by the appended claims.

We claim:

1. Method of making a composite car door panel which is adapted to be attached to the inner side of a car door frame, the method comprising the steps of: providing a generally planar first panel section having a series of holes, providing fasteners each having a head and a shank projecting from the head, securing the fasteners to the first panel section with the heads against an inner surface of the first panel section and with the shanks projecting beyond an outer surface of the first panel section and adapted to be received in holes in the car door frame, the shanks of the fasteners being small enough relative to the holes so that the fasteners can be oriented relative to the first panel section, providing pressure sensitive labels each having an adhesive-free area, applying the labels to the inner surface of the first panel with the adhesive free areas masking off the heads, the adhesive-free area of each label being large enough to enable the fastener to be oriented relative to the first panel section, providing a generally planar second panel section having a coating of pressure sensitive adhesive on one surface, and adhering the second panel section to the inner surface of the first panel section with the labels masking the pressure sensitive adhesive from the heads.

2. Method as defined in claim 1, wherein the step of providing pressure sensitive labels includes the step of providing labels with spaced apart pressure sensitive adhesive zones.

3. Method as defined in claim 1, wherein the step of providing pressure sensitive labels includes the step of providing labels with two spaced adhesive zones and the remainder of each label being free of adhesive.

4. Method as defined in claim 1, further comprising the steps of orienting the shanks into alignment with holes in the car door frame, and pushing the shanks into the car door frame holes.

5. Method of making a composite car door panel which is adapted to be attached to the inner side of a car door frame, the method comprising the steps of: providing a generally planar first panel section having a series of holes, providing fasteners, securing the fasteners loosely to the first panel section so that the fasteners are adapted to be received in holes in the car door frame, providing pressure sensitive labels each having an adhesive-free area, applying the labels to the inner surface of the first panel with the adhesive free areas masking off the fasteners, the adhesive-free area of each label being large enough to enable the fastener to be oriented relative to the first panel section, providing a generally planar second panel section having a coating of pressure sensitive adhesive on one surface, and adhering the second panel section to the inner surface of the first panel section with the labels masking the pressure sensitive adhesive from the fasteners.

6. Method of making a composite car door panel which is adapted to be attached to the inside of a car door frame, the method comprising the steps of: providing a generally planar first panel section having a series of holes, providing fasteners each having a head and a shank projecting from the head, securing the fasteners to the first panel section with the heads against an inner surface of the first panel section and with the shanks projecting beyond the outer surface of the first panel section and adapted to be received in holes in the car door frame, the shanks of the fasteners being small enough relative to the holes so that the fasteners can be oriented relative to the first panel section, masking off the heads of the fasteners while still enabling the fasteners to be oriented, providing a generally planar second panel section having a coating of pressure sensitive adhesive on one surface, and adhering the second panel section to the inner surface of the first panel section by means of the pressure sensitive adhesive with the heads being masked off from the pressure sensitive adhesive.

7. Method as defined in claim 6, wherein the masking step includes using a series of labels each having at least two pressure sensitive adhesive zones spaced by an adhesive-free zone, wherein each adhesive-free zone covers the head of the respective fastener.

8. Method as defined in claim 6, wherein the heads are masked off by applying labels over the holes.

9. Method as defined in claim 6, wherein the heads are masked off by applying labels to the first panel section before the fasteners are inserted into the holes.

10. Method of making a composite car door panel which is adapted to be attached to the inside of a car door frame, the method comprising the steps of: providing a generally planar first panel section having a series of holes, providing fasteners, securing the fasteners loosely to the first panel section so that the fasteners are adapted to be received in holes in the car door frame, masking off the fasteners while still enabling the fasteners to be oriented, providing a generally planar second panel section having a coating of pressure sensitive adhesive on one surface, and adhering the second panel section to the inner surface of the first panel section by means of the pressure sensitive adhesive with the fasteners being masked off from the pressure sensitive adhesive.

11. A new use of a pressure sensitive label having a planar surface with an adhesive-free zone and at least one zone with pressure sensitive adhesive comprising the step of disposing said adhesive-free zone over the head of a fastener used in securing a car door panel to a car door frame to facilitate relative movement between said panel and said fastener.

12. The invention as defined in claim 11, wherein the label has a spaced pair of adhesive zones and the adhesive-free zone is between the adhesive zones.

* * * * *